J. HAGEMAN.
Wheels for Vehicles.
No. 139,144.  Patented May 20, 1873.
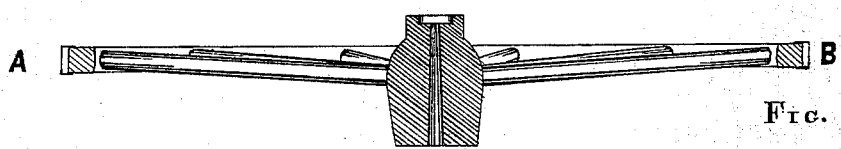
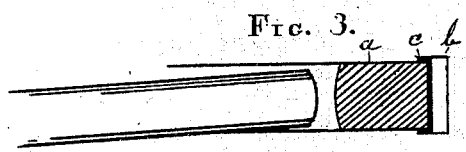
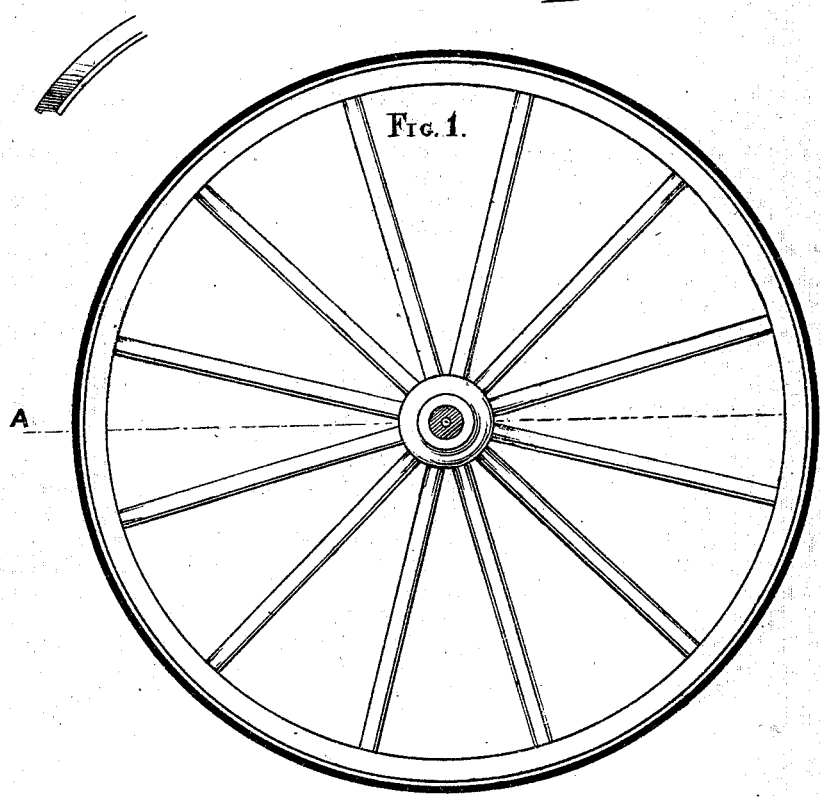
WITNESSES:  INVENTOR:

UNITED STATES PATENT OFFICE.

JAMES HAGEMAN, OF WILLIAMSBURG, OHIO.

IMPROVEMENT IN WHEELS FOR VEHICLES.

Specification forming part of Letters Patent No. 139,144, dated May 20, 1873; application filed February 25, 1873.

*To all whom it may concern:*

Be it known that I, JAMES HAGEMAN, of Williamsburg, in the county of Clermont and State of Ohio, have invented certain Improvements in Wagon-Wheels, of which the following is a specification:

This invention relates to the binding of the fellies of wagon and carriage wheels with sheet or thin iron in one or more pieces, with a flange turned over each corner to any desired width before the tire is set.

The advantages consequent on this improvement are: The wood is less liable to burn while shrinking on the hot tire. The flange protects the delicate corner of the felly from wearing away; prevents the wheel from being weakened by keeping the felly in line with the tire at the joints. Dowel-pins are rendered unnecessary. The nails which secure the tire are kept from working in the wood. When the wheel has run in the hot sand so as to slacken the tire, it prevents the sand from grinding away the wood under the tire; hence when it becomes cool again it is firm as at first.

Figure 1 is a side view of a wheel embodying my invention. Fig. 2 is a section of the same through the line A B. Fig. 3 is an enlargement of the part B, representing by the heavy dark line the end of the strip of sheet-iron covering the tire-surface and turning over each side of the felly. Fig. 4 is a detached portion of the sheet-iron binding prepared for putting on.

A B represent a vehicle-wheel, in which $a$ is the felly, $b$ the tire, and $c$ the sheet-iron protector or binding.

I claim—

In a vehicle-wheel, the combination of the felly $a$, binding $c$, and tire $b$, all constructed and arranged substantially as set forth.

JAMES HAGEMAN.

Witnesses:
HOMER MCLEAN,
WM. S. MCLEAN.